(12) United States Patent
Jessup et al.

(10) Patent No.: US 7,631,896 B2
(45) Date of Patent: Dec. 15, 2009

(54) SLEEPER BUNK RESTRAINT SYSTEM FOR A VEHICLE

(75) Inventors: Chris P. Jessup, Sheridan, IN (US); Douglas W. Bittner, Indianapolis, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 325 days.

(21) Appl. No.: 11/397,662

(22) Filed: Apr. 4, 2006

(65) Prior Publication Data

US 2006/0249944 A1 Nov. 9, 2006

Related U.S. Application Data

(60) Provisional application No. 60/671,911, filed on Apr. 15, 2005.

(51) Int. Cl.
*B60R 21/02* (2006.01)
(52) U.S. Cl. .................... 280/749; 280/748; 280/730.1; 296/190.02
(58) Field of Classification Search ............... 280/730.1, 280/749, 751, 748; 296/35.2, 190.02, 190.06; 105/314, 316, 321, 324; 297/487
See application file for complete search history.

(56) References Cited

U.S. PATENT DOCUMENTS

| | | | |
|---|---|---|---|
| 1,336,943 A | 4/1920 | Crane | |
| 1,959,974 A | 5/1934 | Westgate | |
| 2,706,819 A | 4/1955 | McClure | |
| 3,695,698 A | 10/1972 | Trump | |
| 4,141,093 A | 2/1979 | Marsden | |
| 4,368,902 A | 1/1983 | McDowell | |
| 4,630,324 A | 12/1986 | Fligsten et al. | |
| 5,375,879 A | 12/1994 | Williams et al. | |
| 5,385,367 A * | 1/1995 | Tanaka et al. ............... | 280/733 |
| 5,529,341 A | 6/1996 | Hartigan | |
| 5,536,042 A | 7/1996 | Williams et al. | |
| 5,632,520 A | 5/1997 | Butz | |
| 5,690,355 A | 11/1997 | Kleinberg | |
| 5,727,814 A | 3/1998 | White | |
| 5,876,059 A | 3/1999 | Kleinberg | |
| 6,004,084 A | 12/1999 | Moker | |
| 6,135,497 A | 10/2000 | Sutherland et al. | |
| 6,217,069 B1 | 4/2001 | Ganesan | |
| 6,367,839 B1 | 4/2002 | Langhoff | |
| 6,405,391 B1 | 6/2002 | Hakansson | |
| 6,428,044 B1 | 8/2002 | Ghantae | |
| 6,565,120 B2 | 5/2003 | Ganesan | |
| 6,612,606 B1 | 9/2003 | Bergenheim et al. | |
| 7,097,204 B2 * | 8/2006 | Jessup et al. ................. | 280/748 |
| 2004/0012183 A1 * | 1/2004 | Jessup et al. ................. | 280/748 |

FOREIGN PATENT DOCUMENTS

EP 1069031 A2 7/2000
WO WO 02/16172 A1 2/2002

* cited by examiner

*Primary Examiner*—Paul N Dickson
*Assistant Examiner*—Drew Brown
(74) *Attorney, Agent, or Firm*—Barnes & Thornburg LLP (57) ABSTRACT

A sleeper bunk restraint system comprises a sleeper bunk configured to be carried by a vehicle, a curtain extendable over an occupant-supporting top surface of the bunk, and a curtain support member configured to support the curtain away from the top surface of the bunk.

15 Claims, 9 Drawing Sheets

SLEEPER BUNK RESTRAINT SYSTEM FOR A VEHICLE

CROSS-REFERENCE TO RELATED U.S. PATENT APPLICATION

This patent application claims priority to, and the benefit of, provisional patent application Ser. No. 60/671,911, filed Apr. 15, 2005, the disclosure of which is incorporated herein by reference.

FIELD OF THE INVENTION

The present invention relates generally to vehicle restraint systems, and more specifically to restraint systems for a vehicle sleeper bunk.

BACKGROUND

Sleeper bunks are conventionally provided in the rear portions of over-the-road, heavy-duty trucks, although such sleeper bunks may also be provided in other motor vehicles such as recreational vehicles, buses, vans, and the like. It is desirable with such sleeper bunks to provide a restraining system that confines the bunk occupant to the bunk area, thereby protecting the bunk occupant, as well as other occupants of the vehicle, in the event of a vehicle crash, rollover, rapid acceleration, rapid deceleration, and/or any other event that may otherwise cause the bunk occupant to become dislodged from the sleeper bunk area.

SUMMARY

The present invention may comprise one or more of the features recited in the attached claims, and/or one or more of the following features and combinations thereof. A sleeper bunk restraint system may comprise a sleeper bunk configured to be carried by a vehicle, a curtain and a curtain support member. The curtain may be configured to be extendable over an occupant-supporting top surface of the bunk. The curtain support member may be configured to support the curtain away from the top surface of the bunk.

The sleeper bunk may be mounted to a support structure of the vehicle. The curtain may have a first end mounted to the support structure of the vehicle. The curtain may have a second end configured to be releasably secured to the bunk. Alternatively, the sleeper bunk restraint system may further include a curtain attachment member mounted to the support surface and extending under a bottom surface of the bunk opposite the top surface. In this case, the second end of the curtain may be configured to be releasably secured to the curtain attachment member. The curtain attachment member may have one end mounted to the support structure and an opposite end configured to releasably engage the second end of the curtain. The sleeper bunk restraint system may further include at least a first engagement member attached to the second end of the curtain, and at least a second engagement member attached to the opposite end of the curtain attachment member. The at least a first engagement structure may be configured for releasable engagement with the at least a second engagement structure. The at least a first engagement member may be attached to the bunk.

The curtain support member may be configured to engage the curtain between the first and second ends of the curtain and support the curtain away from the top surface of the bunk. The curtain support member may be mounted to the support structure. The curtain support member may be pivotally mounted to the support structure. The curtain and the top surface of the bunk may define a space therebetween when the curtain support member engages the curtain. The space may be sized to accommodate a person supported on the top surface of the bunk without the curtain contacting the person.

The curtain may define a width between the first and second ends thereof. The curtain support member may be configured to engage the curtain along its width. The curtain support member may define a first end and a second end opposite the first end. The first and second ends of the curtain support member may be mounted to the support structure. The curtain support member may define an elongate portion between the first and second ends thereof. The elongate portion may engage the curtain along its width. The curtain support member may be a tubular member.

The curtain may be formed of a solid flexible material. Alternatively, the curtain may be formed of flexible netting. Alternatively still, the curtain may be formed of a flexible mesh material.

The curtain may define a first curtain portion between the first end thereof and the curtain support member and a second curtain portion between the curtain support member and the second end thereof. The restraint system may further include at least one cushion attached to the second curtain portion. The bunk may define a length having a head end and a foot end opposite the head end. The at least one cushion may include a first cushion attached to the second curtain portion so that the first cushion is positioned adjacent to the head end of the bunk when the curtain extends over the top surface of the bunk. The at least one cushion may further include a second cushion attached to the second curtain portion so that the second cushion is positioned adjacent to the foot end of the bunk when the curtain extends over the top surface of the bunk. Alternatively or additionally, the at least one cushion may include at least one cushion member attached to the second curtain portion so that the at least one cushion member spans the head end and the foot end of the bunk when the curtain extends over the top surface of the bunk.

The at least one cushion may be at least partially filled with a cushion material. Alternatively or additionally, the at least one cushion may include at least one inflatable air bladder. In this embodiment, the at least one cushion may additionally include a plurality of springs. The at least one inflatable bladder may be configured to self inflate with air resulting from expansion of the plurality of springs. The bunk may be pivotally mounted to the support surface, wherein the bunk may have a use position with the top surface oriented to support a person and a stored condition with the bunk pivoted toward the support structure. The curtain support member may have a use position supporting the curtain and a stored position with the curtain support member pivoted toward the support structure. The at least one cushion may be compressible from a normal state to a compressed state when the bunk and the curtain support member are pivoted to their stored positions with the at least one cushion positioned between the bunk and the support structure. The at least one cushion may be resilient so that it returns to its normal state after the bunk is pivoted away from the support structure.

A sleeper bunk restraint system may comprise a sleeper bunk, a curtain and a curtain support member. The sleeper bunk may be mounted to a support structure of a vehicle. The sleeper bunk may define a length extending generally transverse to a direction of travel of the vehicle. The curtain may have a first end attached to the support structure and a second end opposite the first end. The curtain may define a width and be configured to be extendable over an occupant-supporting top surface of the bunk with the width of the curtain generally parallel with the length of the bunk. The curtain support member may be movably mounted to the support structure and be configured to engage the curtain between the first and second ends thereof to support the curtain over and away from the top surface of the bunk.

The bunk may define a head end and a foot end opposite the head end. The curtain support member may define a first end and a second end opposite the first end. The sleeper bunk restraint system may further include a first bracket and a second bracket. The first bracket may movably mount the head end of the bunk to the support structure. The second bracket may movably mount the foot end of the bunk to the support structure. The first end of the curtain support member may be movably mounted to the first bracket and the second end of the curtain support member may be movably mounted to the second bracket. Alternatively, a first bracket may be mounted to the support surface above the head end of the bunk, and a second bracket may be mounted to the support surface above the foot end of the bunk. The first end of the curtain support member may be movably mounted to the first bracket and the second end of the curtain support member may be movably mounted to the second bracket.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
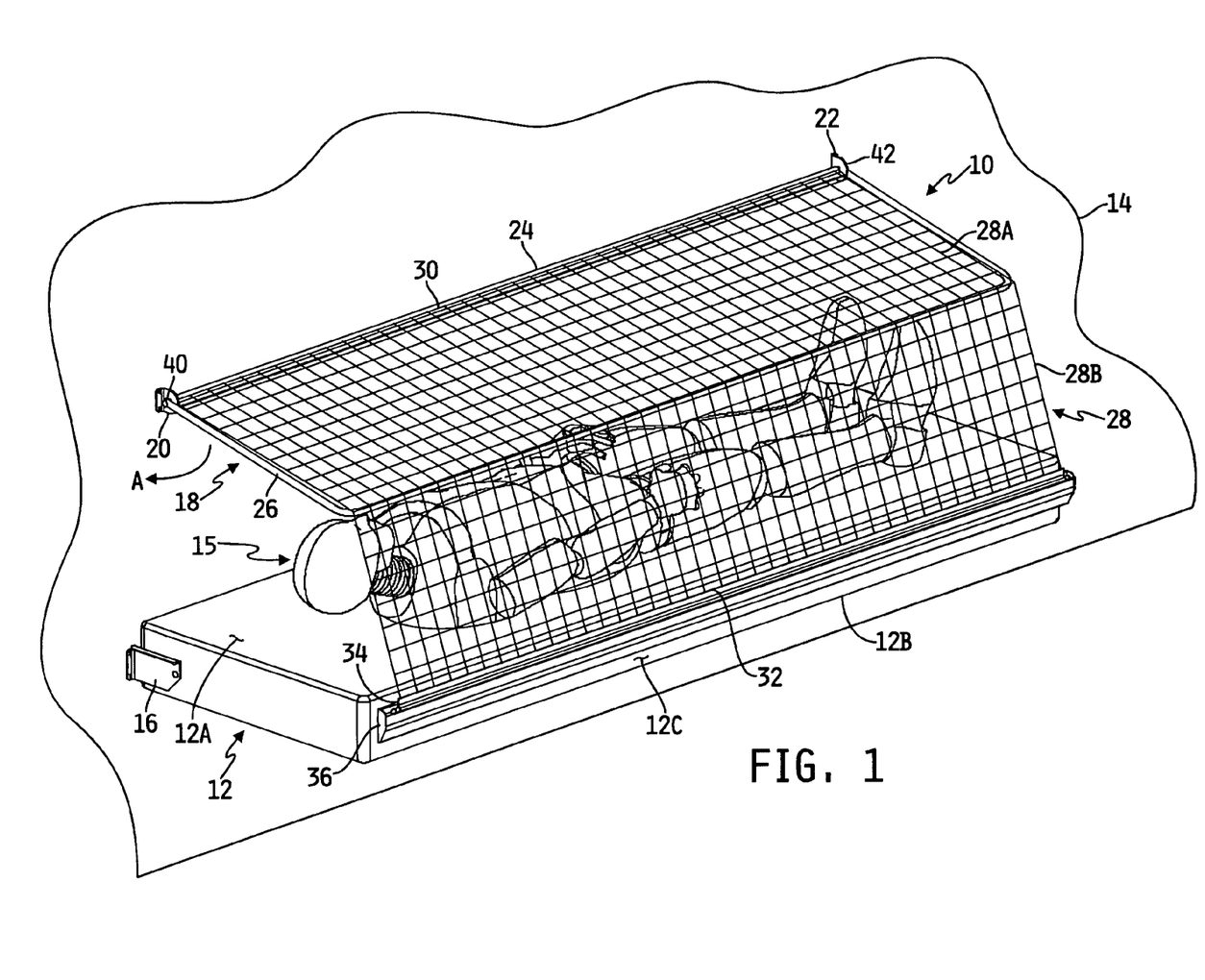
FIG. 1 is a perspective view of one illustrative embodiment of a sleeper bunk restraint system for a motor vehicle.

Referring now to FIG. 1, one illustrative embodiment of a sleeper bunk restraint system 10 is shown. Generally, the sleeper bunk restraint system 10 includes a sleeper bunk 12 configured to be carried by a motor vehicle, a curtain 28 that is extendible over an occupant supporting top surface 12A of the bunk 12, and a curtain support member 18 configured to support the curtain 28 away from the top surface 12A of the bunk 12. In the illustrated embodiment, the sleeper bunk 12 defines a length having a head end and a foot end (interchangeable), and the sleeper bunk 12 is positioned so that the length is generally transverse to a direction of travel of the vehicle. In other embodiments, the length of the sleeper bunk need not be generally transverse to the direction of vehicle travel.

The sleep bunk 12 is generally mounted to a support structure 14 of the vehicle, wherein the support structure 14 may be a rear wall of the cab area of the vehicle or other support structure within the vehicle. In the illustrated embodiment, the sleeper bunk 12 is mounted to the support surface 14 via at least two brackets 16 (only one shown), with at least one bracket 16 positioned at the head end of the bunk 12 and another bracket 16 positioned at or near the foot end of bunk 12. In one embodiment, the bracket 16 is a pivoting bracket so that the sleeper bunk 12 is pivotable upwardly toward the support structure 14 to a bunk storage position (see FIG. 8). It will be understood, however, that the sleeper bunk 12 need not be pivotably mounted to the support surface 14 and/or may alternatively be mounted to the support structure 14 and to an adjacent structure, such as the floor of the vehicle, and/or may be mounted to any such support structure using any number of brackets or other attachment mechanisms. In any case, the sleeper bunk has a bottom surface 12B opposite to the top, occupant-supporting surface 12A, and has a front edge or wall 12C and an opposite back edge or wall that is adjacent to the support structure 14 when the bunk 12 is in its fully deployed position as illustrated in FIG. 1.

The curtain support member 18 is mounted to the support surface 14 of the vehicle generally above the surface 12A of the sleeper bunk 12, when the sleeper bunk 12 is in its fully deployed position as illustrated in FIG. 1, via at least two mounting brackets 20 and 22. In the illustrated embodiment, the curtain support member 18 includes an elongated support member 24 extending between and attached to each of the brackets 20 and 22 adjacent to the support structure 14. The curtain support member 18 further includes another elongated support member 26 having a first end 40 attached to the bracket 20 and a second end 42 attached to the bracket 22. The elongated support member 26 generally extends forwardly from the bracket members 20 and 22 over the occupant-supporting top surface 12A, and then generally along the length of the sleeper bunk 12 shown in FIG. 1. In the illustrated embodiment, the curtain support member 18 is pivotally mounted to the brackets 20 and 22 so that the curtain support member 18 may pivot between a fully deployed position as shown in FIG. 1, downwardly in the direction of the arrow A to a stored position adjacent to the support structure 14 (see FIGS. 7 and 8).

The curtain 28 has a first end 30 attached to the elongated curtain support member 24, and a second end 32, opposite the first end 30, that is releasably attachable to a curtain securing mechanism. In the illustrated embodiment, the curtain 28 defines a width that substantially spans the length of the sleeper bunk 12 as shown in FIG. 1. Alternatively, the width of the curtain 28 may be sized that it does not fully extend between the head and foot ends of the sleeper bunk 12, or may be sized to extend beyond the head and foot ends of the sleeper bunk 12. In any case, the curtain 28 defines a first curtain portion 28A and a second curtain portion 28B. In the illustrative embodiment, the curtain support member 26 is configured to engage, in its fully deployed position, the curtain 28 between the first curtain portion 28A and the second curtain portion 28B as shown in FIG. 1. The curtain support number 18 thus supports the curtain 28 upwardly and away from the sleeper bunk 12 to form a tent-like structure that defines a space between the curtain 28 and the top surface 12A of the bunk 12. The space defined between the curtain 28 and the top surface 12A of the bunk 12 is generally sized to accommodate a person 15 supported on the top surface 12A of the bunk 12 without the curtain 28 contacting the person 15 as shown in FIG. 1.

In the illustrated embodiment, the second end 32 of the curtain 28 is attached to a curtain attachment structure generally shown at 34, and the front edge 12C of the sleeper bunk 12 includes a mating attachment structure, generally shown at 36, that is configured to engage the attachment structure 34 to thereby secure the second end 32 of the curtain 28 to the bunk 12 and/or to the support structure 14 and/or to another support structure within the vehicle. Any conventional attachment structure may be used to form the attachment structures 34 and 36, and one example attachment structure will be described hereinafter with respect to FIGS. 4A and 4B.

Figure 2:
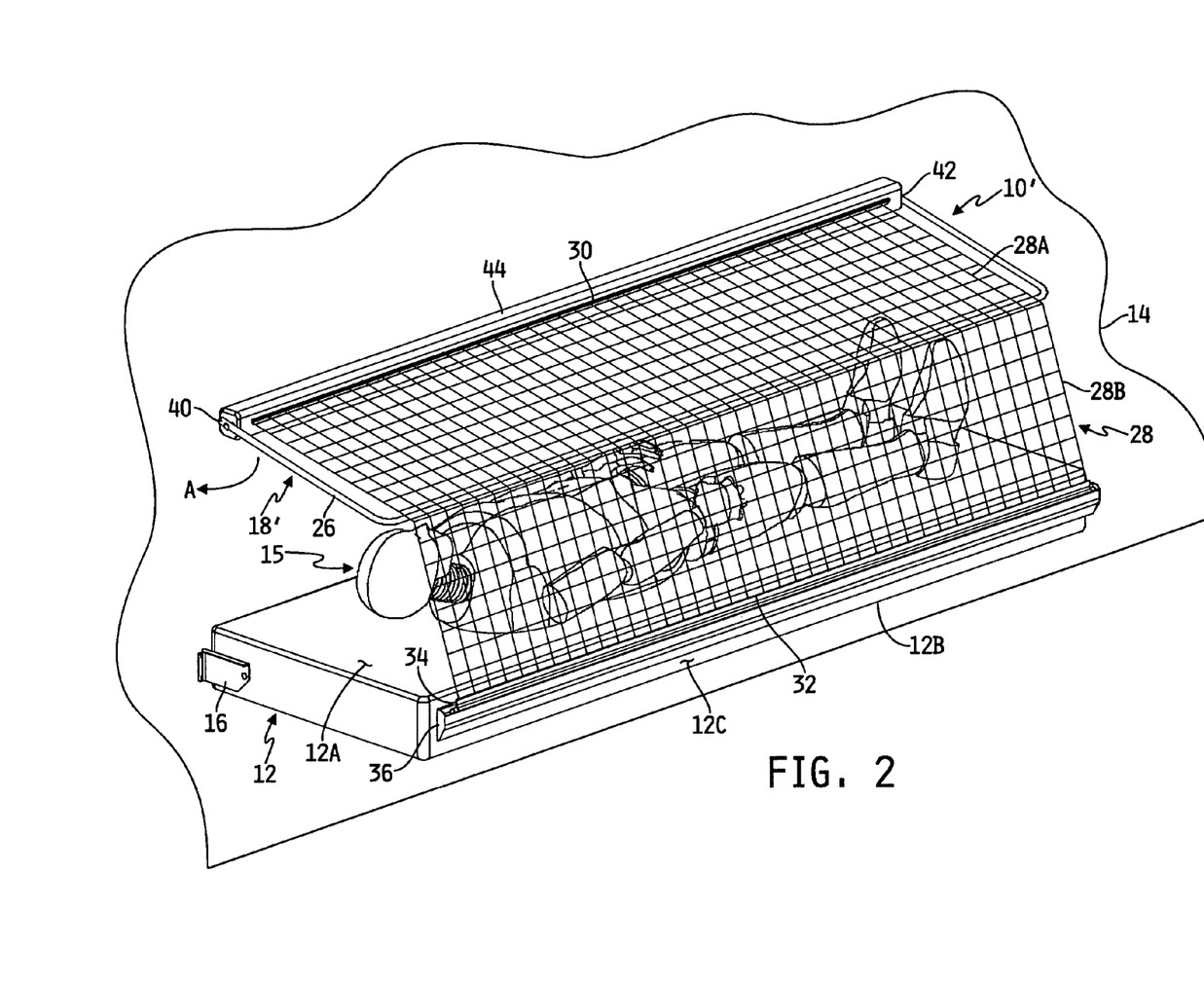
FIG. 2 is a perspective view of another illustrative embodiment of a sleeper bunk restraint system for a motor vehicle.

Referring now to FIG. 2, another illustrative embodiment of a sleeper bunk restraint system 10' is shown. The sleeper bunk restraint system 10' of FIG. 2 is identical in many respects to the sleeper bunk restraint system 10 of FIG. 1, and like numbers are therefore used to identify like components. In the sleeper bunk restraint system 10' of FIG. 2, the brackets 20 and 22, as well as the elongated support member 24 of the sleeper bunk restraint system 10 of FIG. 1 are replaced with single curtain support member mounting structure 44. The mounting structure 44 includes one or more brackets or other mounting structures (not shown) for attaching the mounting structure 44 directly to the support structure 14 of the vehicle. The first end 30 of the curtain 28 is attached directly to the mounting structure 44. In the resulting modified curtain support member 18', the elongated support member 26 is attached at either end 40 and 42 to corresponding opposite ends of the mounting structure 44. As with the embodiment described with respect to FIG. 1, the curtain support member 26 is, in the illustrated embodiment, pivotally mounted or attached to the mounting structure 44. The mounting structure 44 may be fitted with cushioning material about its exterior and/or may be covered with fabric or other suitable material to aesthetically match the support surface 14 of the vehicle.

Figure 3:
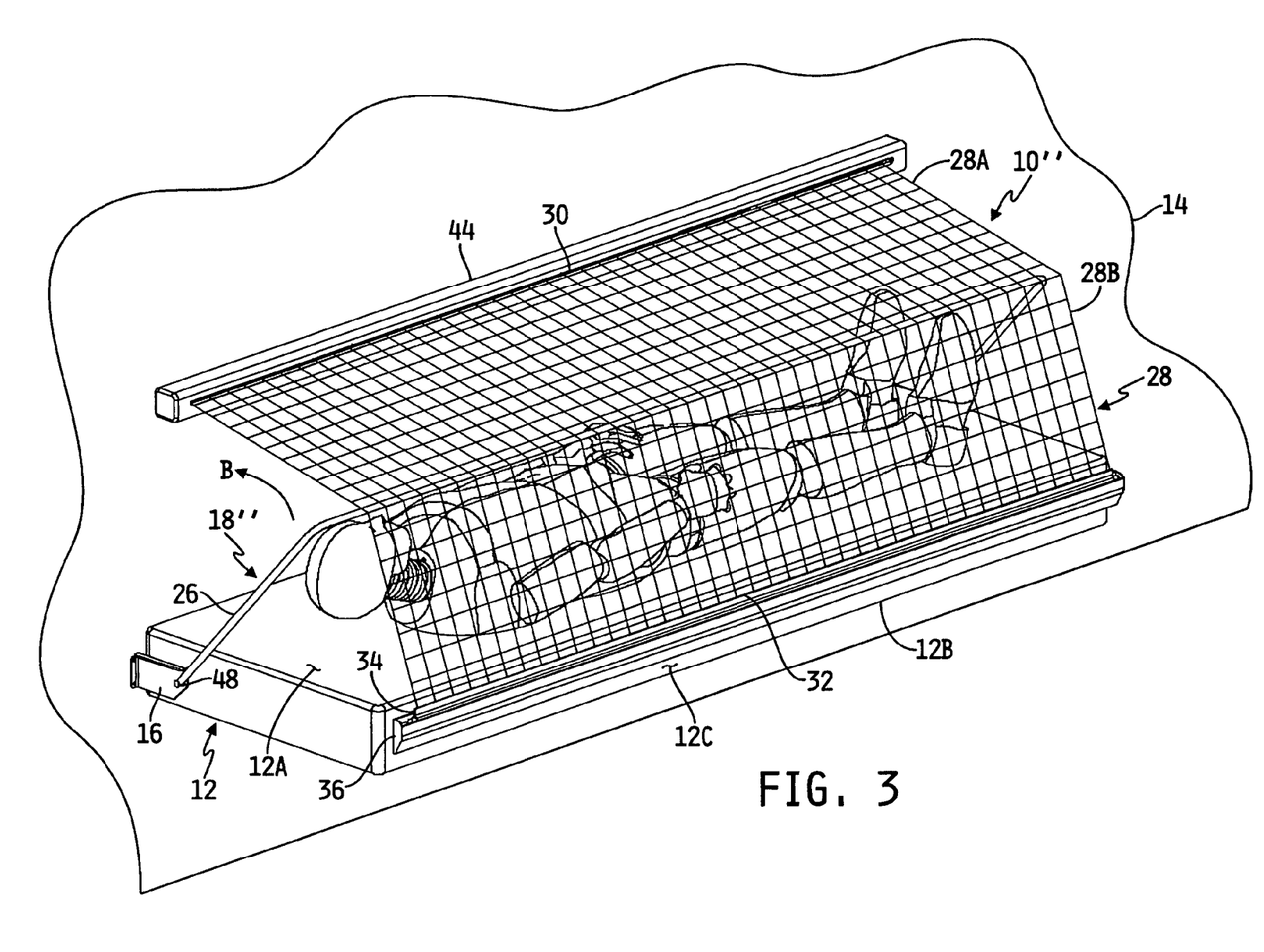
FIG. 3 is a perspective view of yet another illustrative embodiment of a sleeper bunk restraint system for a motor vehicle.

Referring now to FIG. 3, another illustrative embodiment of a sleeper bunk restraint system 10" is shown. The sleeper bunk restraint system 10" includes components that are identical to those illustrated and described with respect to FIGS. 1 and/or 2, and such components are accordingly identified with like numbers in the embodiment illustrated in FIG. 3. The embodiment 10" of FIG. 3 differs from those illustrated in FIGS. 1 and 2 in that the curtain support member 18" includes only a single elongated member 26 having a first end 48 attached to the bunk mounting bracket 16 at one end of the bunk 12, and an opposite end attached to a similar bunk mounting bracket (not shown) at an opposite end of the bunk 12. In the illustrated embodiment, the elongated curtain support member 26 is pivotally attached to the bunk mounting brackets 16 at the opposite ends of the bunk 12 so that the elongated curtain support member 26 is pivotable between a fully deployed position supporting the curtain 28 between the curtain portions 28A and 28B as shown in FIG. 3, and upwardly along the directional arrow B to a stored position adjacent to the support structure 14.

Figure 4A:
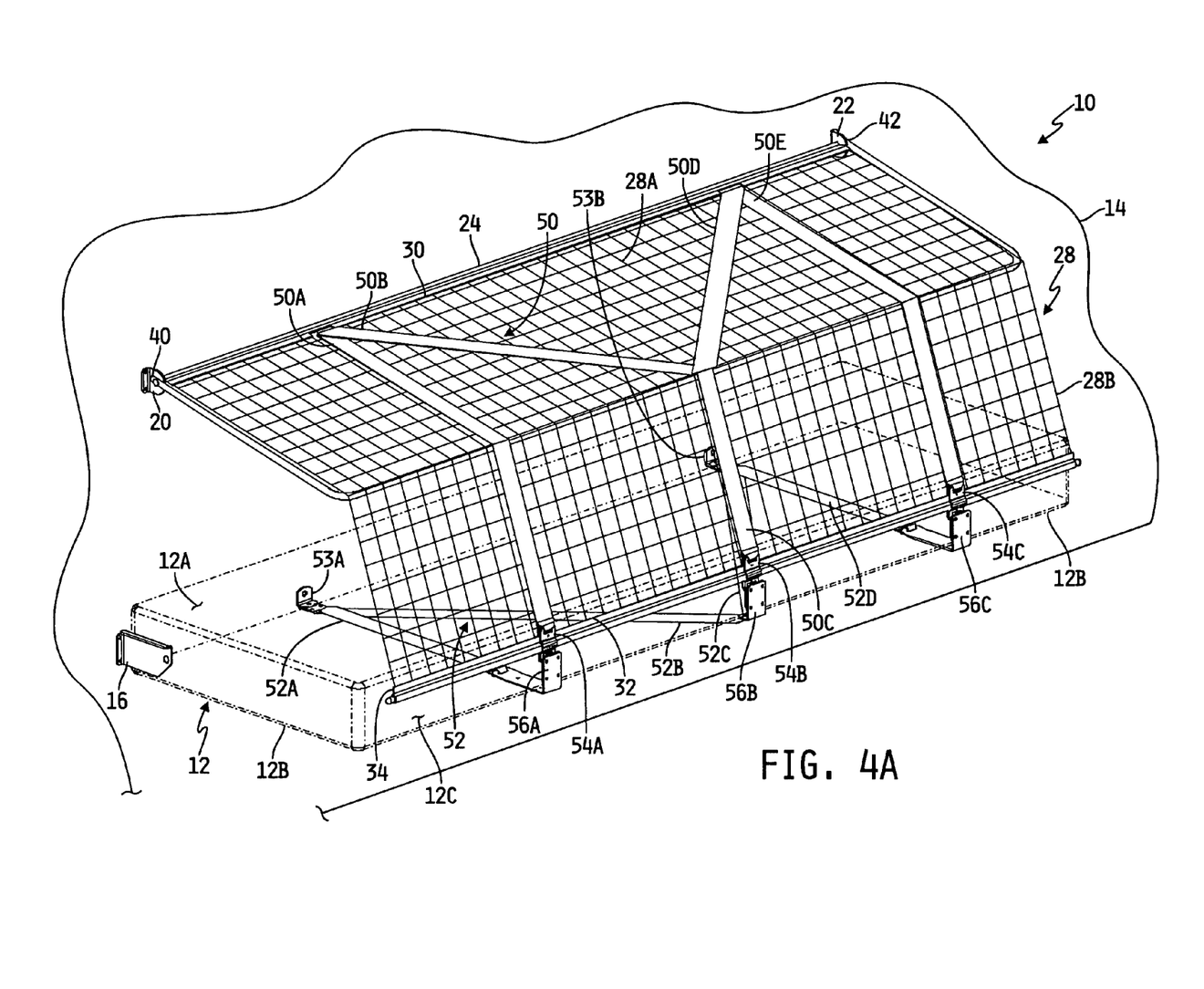
FIG. 4A is a perspective view of a further illustrative embodiment of a bunk restraint system for a motor vehicle.

Referring now to FIG. 4A, a further illustrative embodiment of a sleeper bunk restraint system 10 is shown. The sleeper bunk restraint system illustrated in FIG. 4A is identical in many respects to that illustrated in FIG. 1, and like numbers are therefore used to identify like components. The embodiment shown in FIG. 4A illustrates one example attachment arrangement for releasably attaching the second end 32 of the curtain 28 to a suitable support structure to thereby arrange the curtain 28 in its fully deployed position as shown in FIGS. 1-4A. It will be understood that the example curtain attachment arrangement illustrated in FIGS. 4A and 4B is applicable to any of the sleeper bunk restraint system embodiments 10, 10' and 10" of FIGS. 1-3 respectively.

In the embodiment illustrated in FIG. 4A, a top curtain attachment member 50 is provided in the form of a top curtain attachment harness having a first web or tether 50A attached at one end to the elongated curtain support member 24 near the bracket 20, and an opposite end attached a top engagement member 54A. The top engagement member 54A is attached to the curtain attachment member 34, which in the illustrated embodiment is an elongated member having the second end 32 of the curtain 28 attached thereto along its length. A second web or tether 50B is attached at one end to the elongated curtain support member 24 at or near the attachment point of the web or tether 50A, and a second end attached to a first end of a third web or tether 50C. One end of a fourth web or tether 50D is attached to the elongated curtain support member 24 near the bracket 22, and a second end of the fourth web or tether 50D is attached to the first end of the third web or tether 50C. A second end of the third web or tether 50C is attached to another top engagement member 54B that is itself attached to the curtain attachment member 34. One end of a fifth web or tether 50E is attached to the elongated curtain support member 24 at or near the attachment point of the fourth web or tether 50D, and an opposite end of the fifth web or tether 50E is attached to another top engagement member 54C that is itself attached to the curtain attachment member 34.

A bottom curtain attachment member 52 is provided in the form of a bottom curtain attachment harness having a first web or tether 52A that is attached at one end to the support structure 14 beneath the bottom surface 12B of the bunk 12 via a bracket 53A, and at an opposite end to a bottom engagement member 56A that may or may not be attached to the front edge 12C of the bunk 12. One end of a second web or tether 52B is attached to the support structure 14 via the bracket 53A, and an opposite end of the second web or tether 52B is attached to another bottom engagement member 56B that may or may not be attached to the front edge 12C or the bunk 12. One end of a third web or tether 52C is attached to the support structure 14 via another bracket 53B, and a second end of the third web or tether 52C is attached to the engagement member 56B. One end of a fourth web or tether 52D is attached to the support structure 14 via the bracket 53B, and an opposite end of the fourth web or tether 52D is attached to another bottom engagement member 56C that may or may not be attached to the front edge 12C of the bunk 12.

Figure 4B:
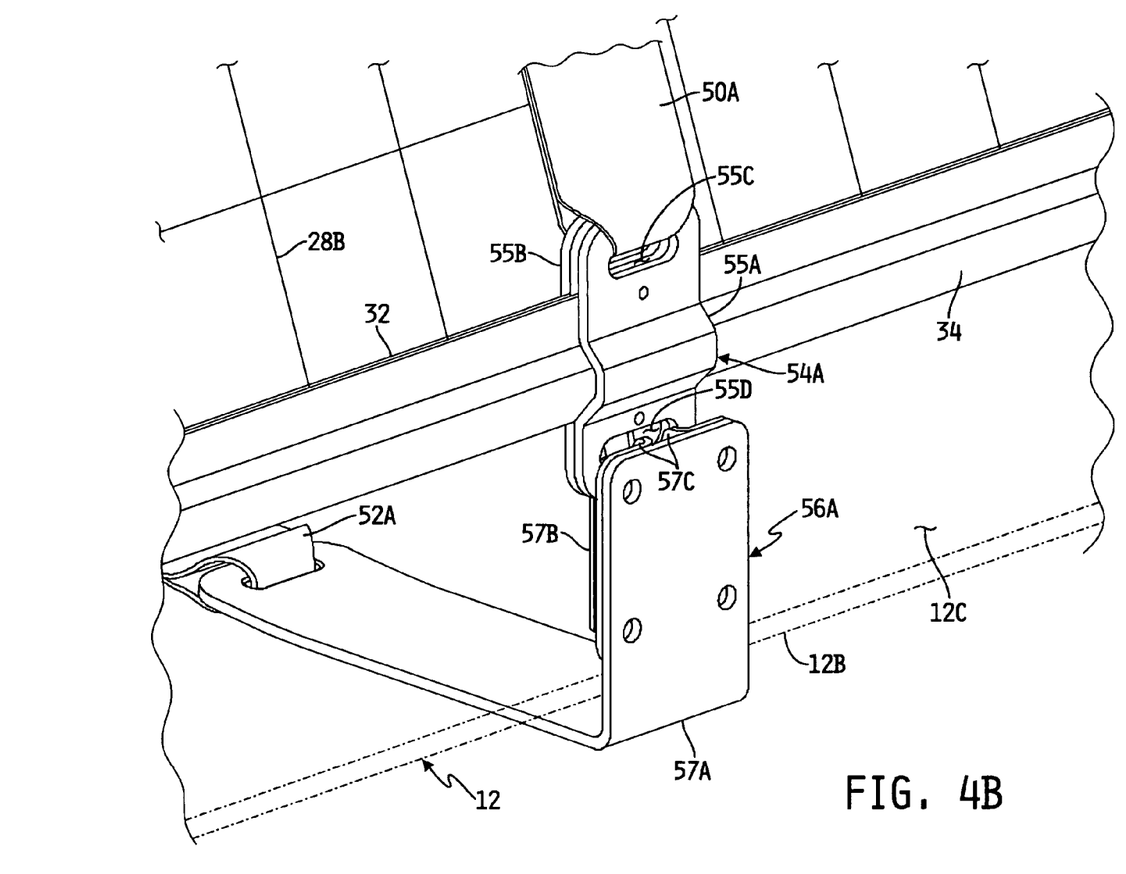
FIG. 4B is a perspective view of the bunk restraint system of FIG. 4A illustrating details relating to one embodiment of the restraint curtain attachment mechanisms.

Referring now to FIG. 4B, one illustrative embodiment of the top and bottom engagement members 54A-54C and 56A-56C respectively is shown with reference to the top and bottom engagement members 54A and 56A respectively. The engagement member 54A includes first and second juxtaposed plates 55A and 55B positioned on either side of the curtain attachment member 34, with one end of the plates 55A and 55B defining juxtaposed slots 55C therethrough. The first web or tether 50A is passed through the juxtaposed slots 55C, and is then attached to itself to thereby secure the first web or tether 50A to the top engagement member 54A. The opposite ends of the plates 55A and 55B define juxtaposed slots 55D therethrough that together define a receiving slot that is configured to engage a protrusion structure 57C of the bottom engagement member 56A to thereby releasably secure the top engagement member 54A to the bottom engagement member 56A.

The bottom engagement member 56A likewise includes first and second juxtaposed plates 57A and 57B having the first lower web or tether 52A attached to one end thereof. Opposite ends of the juxtaposed plates 57A and 57B define the protrusion structure 57C therebetween, wherein the protrusion structure 57C passes through the juxtaposed slots 55D defined by the top engagement member 54A to releasably engage the top engagement member 54A. Those skilled in the art will recognize that other suitable engagement members may be used to releasably engage the second end 32 of the curtain 28 to the front edge 12C of the bunk 12, to the support structure 14 and/or to another adjacent support structure such as the floor of a vehicle.

In the embodiment illustrated in FIGS. 4A and 4B, the curtain 28 may be formed of a solid flexible material, a flexible netting material as illustrated or a flexible mesh material. Strength is imparted to any such material via the top and bottom curtain attachment harnesses 50 and 52. It will be understood, however, that the top and bottom curtain attachment harnesses 50 and 52 illustrated in FIGS. 4A and 4B are not strictly required with the sleeper bunk restraint system described herein, and in fact FIGS. 1-3 illustrate and describe embodiments that do not include such harnesses 50 and 52. In such embodiments, however, the material chosen for the curtain 28 should have sufficient strength on its own to restrain the bunk occupant 15 to the bunk area. One example curtain material that may not require support harnesses, such as the harnesses 50 and 52, is Kevlar. Other suitable materials will become apparent to those skilled in the art. In one specific embodiment, any configuration of the curtain 28 and/or accompanying harness member is designed so that a maximum forward flex of the curtain 28 resulting from contact with a bunk occupant 15 of predefined weight allows only minimal contact with vehicle seats positioned near the front edge 12C of the bunk 12.

Figure 5:
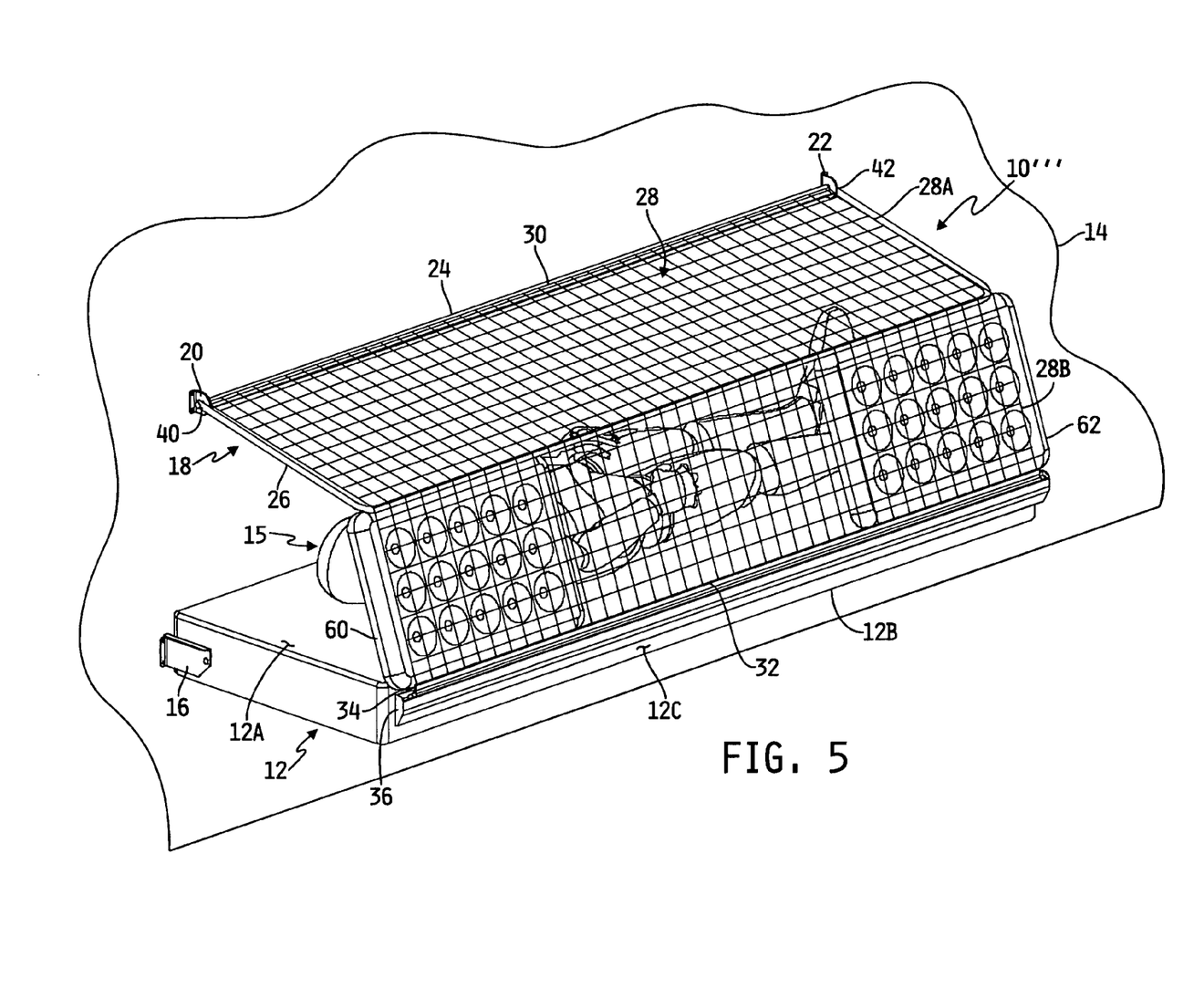
FIG. 5 is a perspective view of still a further illustrative embodiment of a bunk restraint system for a motor vehicle in a fully deployed state.

Referring now to FIG. 5, a further illustrative embodiment of a sleeper bunk restraint system 10''' is shown. The sleeper bunk restraint system 10''' is identical in many respects to the sleeper bunk restraint system 10 illustrated and described with respect to FIG. 1, and like numbers are therefore used to identify like components. It will be understood, however, that the concepts relating to the sleeper bunk restraint system 10''' may be likewise applied to any of the embodiments of the sleeper bunk restraint system shown and described herein with respect to FIGS. 1-4B. In the embodiment illustrated in FIG. 5, a first cushion member 60 is attached to the second portion 28B of the curtain 28 adjacent to head or foot end of the bunk 12, and a second cushion 62 is attached to the second portion 28B of the curtain 28 adjacent to the opposite foot or head end of the bunk 12. The cushions members 60 and 62 provide extra padding near the ends of the bunk 12 to primarily protect the head region of the bunk occupant 15 regardless of the orientation of the person 15 relative to the bunk 12. Alternatively, only one of the cushion members 60 or 62 may be provided, and alternatively still a single cushion member may be attached to the second portion 28B of the curtain 28 that extends along the width, beyond the width, or less than the width, of the curtain 28.

In one embodiment, such one or more cushion members include a number of springs as well as a number of self-inflating air bladders. As one example, the cushion member 60, 62 may include a plurality collapsible springs each contained in a fabric tube extending between the major cushion surfaces. Around the plurality of spring tubes, a number of air bladders or bags may be positioned, e.g., sewn, between the major cushion surfaces. When force is applied slowly to one or both of the major cushion surfaces, air in the number of air bladders or bags is squeezed out of the cushion member 60, 62 through the fabric, and the springs collapse under the applied force, thereby compressing the cushion member 60, 62 in width. Conversely, when force is applied to the cushion member 60, 62 with a high load rate, such as under impact conditions, the air inside of the number of air bladders or bags cannot escape quickly enough to match that of the applied force, and the cushion member 60, 62 therefore provides for resistance under such conditions. In an alternative embodiment, such one or more cushion members 60, 62 may contain collapsible cushion material with memory so that the one or more cushion members 60, 62 may be compressed and expanded in width. In either case, this will allow the restraint system 10''' to occupy minimal space when the sleeper bunk 12 is moved to its stored position as will be described hereinafter with respect to FIGS. 6-8, yet provide for head and/or foot cushioning when the restraint system 10''' is fully deployed. Alternatively still, the one or more cushions may include one or more air bladders suitably coupled to a pressurized air source carried by the vehicle, wherein the one or more air bladders is/are filled with air when the sleeper bunk restraint system 10''' is in its fully deployed position as illustrated in FIG. 5, and is/are deflated when the sleeper bunk restraint system 10''' is moved to its stored position as will be illustrated and described hereinafter.

Figure 6:
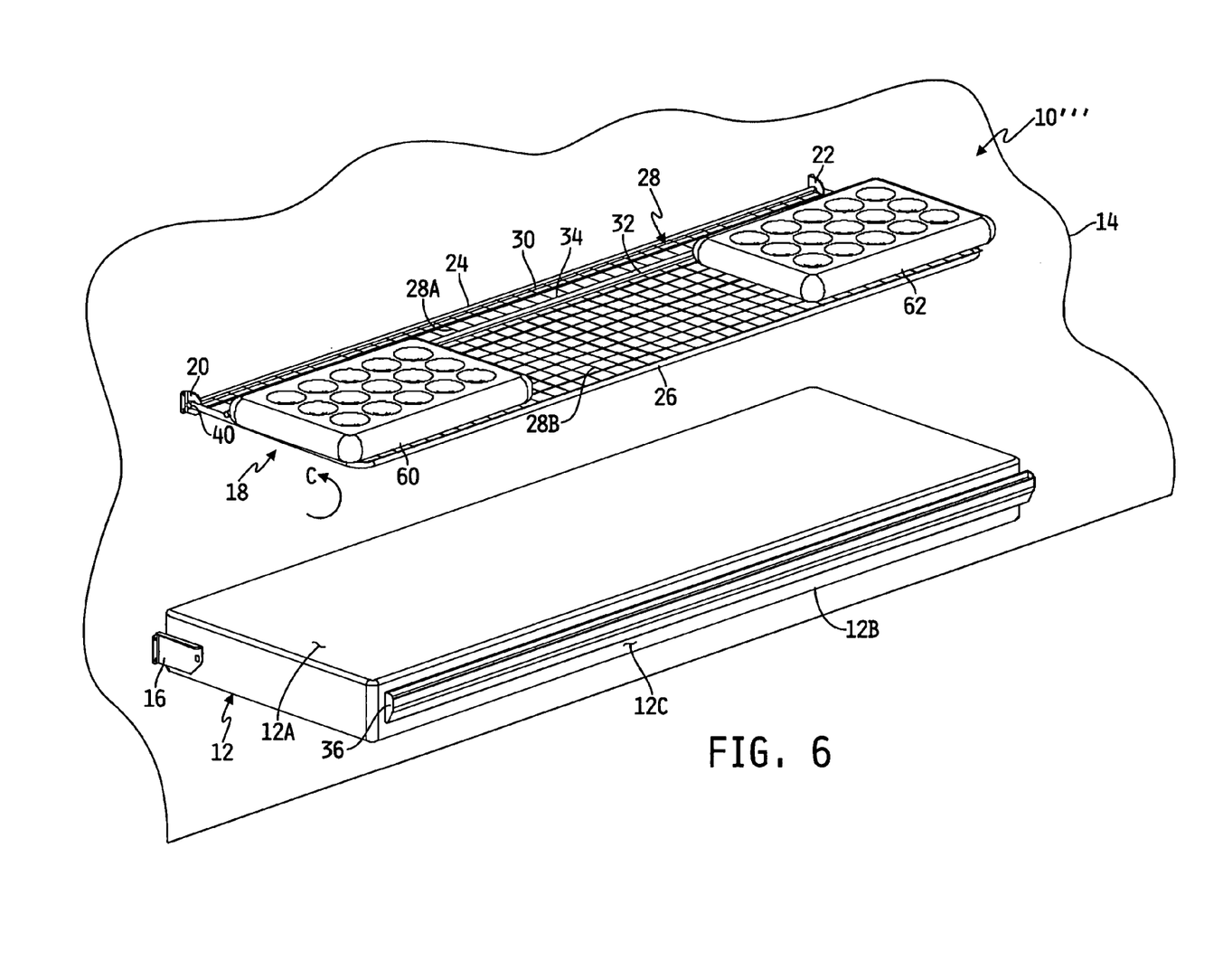
FIG. 6 is a perspective view of the bunk restraint system of FIG. 5 showing the restraint curtain in an intermediate state between the fully deployed state of FIG. 5 and a stored state.

Referring now to FIG. 6, the sleeper bunk restraint system 10''' is shown in an intermediate position between its fully deployed position of FIG. 5 and a stored position as will be shown and described hereinafter with respect to FIGS. 7 and 8. In the position illustrated in FIG. 6, the second end 32 of the curtain 28 has been detached from the front edge 12C of the bunk 12 and/or the support structure 14 and/or other adjacent support structure, and the second portion 28B of the curtain 28 has been folded back in the direction shown by the arrow C so that it rests on the first curtain portion 28A. The cushion members 60 and 62 are, in the position illustrated in FIG. 6, in their fully deployed states.

Figure 7:
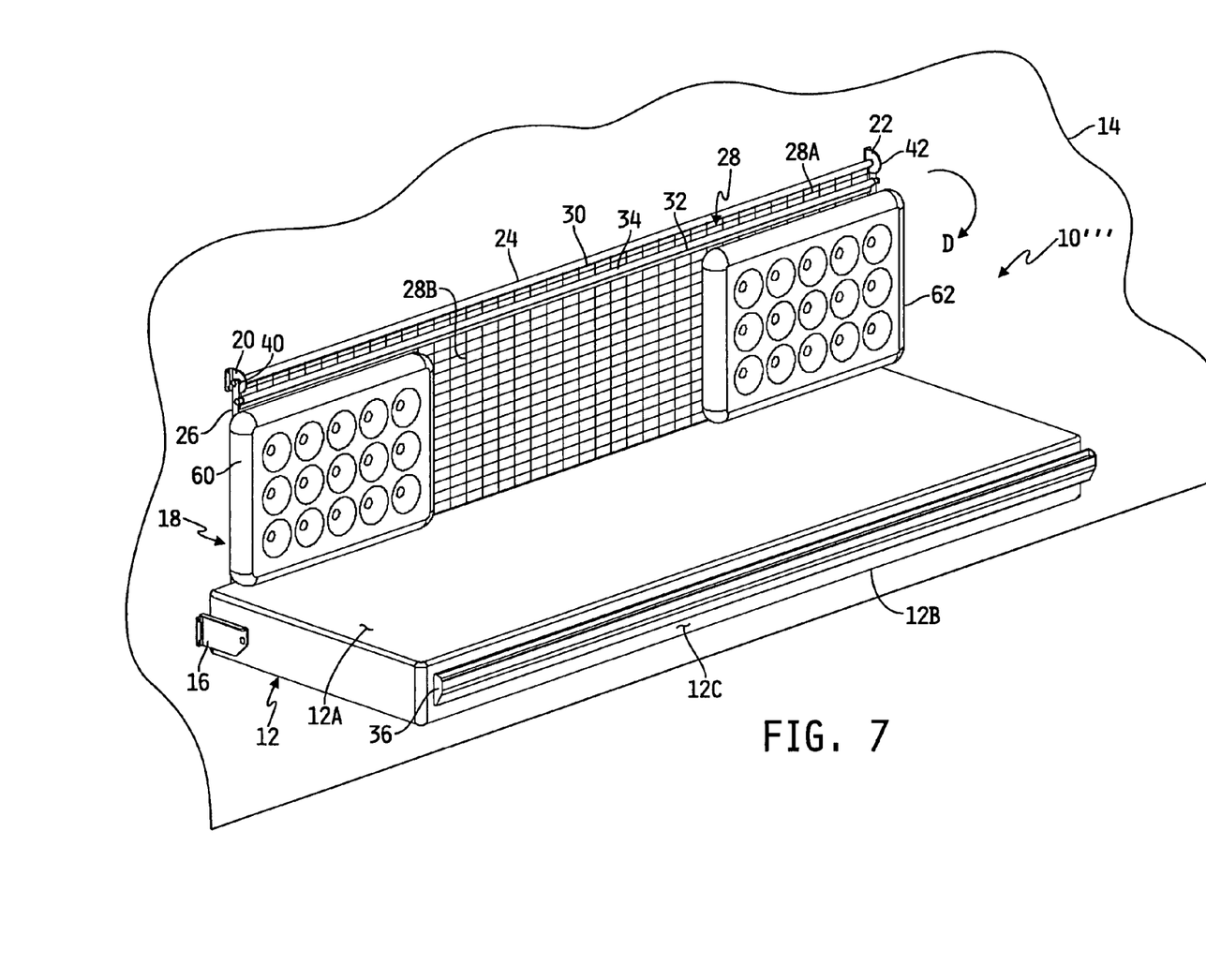
FIG. 7 is a perspective view of the bunk restraint system of FIGS. 5 and 6 showing the restraint curtain in it stored state.
Figure 8:
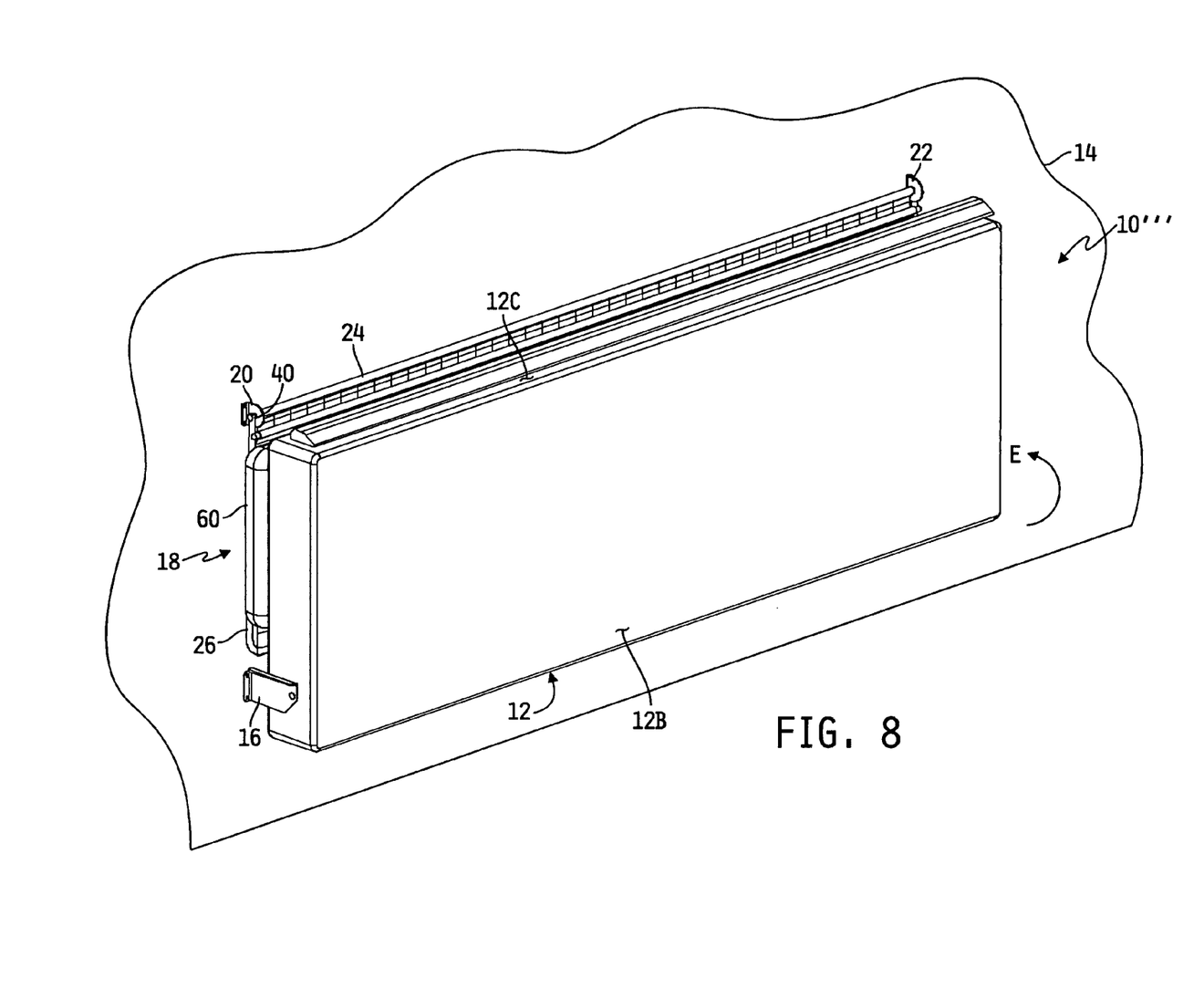
FIG. 8 is a perspective view of the bunk restraint system of FIGS. 5-7 showing the restraint curtain in its store state with the sleeper bunk pivoted upwardly to a stored state against a wall of the vehicle.

Referring to FIG. 7, the sleeper bunk restraint system 10''' has been moved to its stored position by rotating or otherwise moving the curtain support member 18 in the direction indicated by the arrow D so that both curtain portions 28A and 28B, as well as the current support member 18 and the cushions 60 and 62, are positioned adjacent to the support structure 14. The cushion members 60 and 62 are, in the position illustrated in FIG. 7, in their fully deployed states. As shown in FIG. 8, the bunk 12 has been pivoted upwardly in the direction of the arrow E to its stored position with the sleeper bunk restraint system 10''' positioned between the support structure 14 and the top surface 12A of the bunk 12. In this position, the bunk 12 compresses the cushion members 60 and 62 against the support structure 14 so that they are reduced in width for storage. In embodiments wherein the cushion members 60 and 62 comprise a plurality of springs and air bladders or bags, for example, the cushion members 60 and 62 the slow compression force applied to the major cushion surfaces by the bunk 12 and the support surface 14 allows the air in the air bladders or bags to escape through the cushion fabric, as described hereinabove, and the plurality of springs then collapse under this same force. When the sleeper bunk restraint system 10''' is thereafter deployed, the bias of the plurality of springs causes them to expand, thereby creating a partial vacuum inside each of the number of air bladders or bags. The vacuum draws air through the fabric of the cushion members 60 and 62, and into the air bags or bladders, thereby causing them to self inflate. Alternatively, in embodiments wherein the cushion members 60 and 62 comprise compressible memory cushion material, the cushion material compresses under the force applied to the major cushion surfaces, and expands pursuant to its memory properties.

Alternatively still, in embodiments wherein the cushion members 60 and 62 comprise one or more air bladders suitably coupled to a source of pressurized air, the cushion members 60 and 62 may be inflated and deflated using conventional inflatable restraint control techniques.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A sleeper bunk restraint system comprising:
    a sleeper bunk mounted to a support structure of a vehicle and defining a length extending generally transverse to a direction of travel of the vehicle,
    a curtain having a first end attached to the support structure and a second end opposite the first end, the curtain defining a width and configured to be extendable over an occupant-supporting top surface of the bunk with the width of the curtain extending generally along the length of the bunk, and
    a curtain support member movably mounted to the support structure and configured to engage the curtain between the first and second ends thereof to support the curtain over and away from the top surface of the bunk, the curtain support member defining a first end and a second end opposite the first end and an elongate portion between the first and second ends thereof, the elongate portion engaging the curtain along its width.

2. The sleeper bunk restraint system of claim 1 wherein the first and second ends of the curtain support member are mounted to the support structure.

3. The sleeper bunk restraint system of claim 1 wherein the curtain support member is a tubular member.

4. The sleeper bunk restraint system of claim 1 wherein the curtain is formed of a solid flexible material.

5. The sleeper bunk restraint system of claim 1 wherein the curtain is formed of flexible netting.

6. The sleeper bunk restraint system of claim 1 wherein the curtain is formed of a flexible mesh material.

7. The sleeper bunk restraint system of claim 1 wherein the curtain defines a first curtain portion between the first end thereof and the curtain support member and a second curtain portion between the curtain support member and the second end thereof, and further including at least one cushion attached to the second curtain portion.

8. The sleeper bunk restraint system of claim 7 wherein the bunk defines a head end and a foot end opposite the head end,
    wherein the at least one cushion includes a first cushion attached to the second curtain portion and positioned adjacent to the head end of the bunk when the curtain extends over the top surface of the bunk.

9. The sleeper bunk restraint system of claim 8 wherein the at least one cushion includes a second cushion attached to the second curtain portion and positioned adjacent to the foot end of the bunk when the curtain extends over the top surface of the bunk.

10. The sleeper bunk restraint system of claim 7 wherein the bunk defines a head end and a foot end opposite the head end,
    wherein the at least one cushion includes at least one cushion member attached to the second curtain portion, the cushion member configured to span the head end and the foot end of the bunk when the curtain extends over the top surface of the bunk.

11. The sleeper bunk restraint system of claim 7 wherein the at least one cushion is at least partially filled with a cushion material.

12. The sleeper bunk restraint system of claim 7 wherein the at least one cushion includes at least one inflatable air bladder.

13. The sleeper bunk restraint system of claim 12 wherein the at least one cushion further includes a plurality of springs.

14. The sleeper bunk restraint system of claim 13 wherein the at least one inflatable air bladder is configured to self inflate with air resulting from expansion of the plurality of springs.

15. The sleeper bunk restraint system of claim 1 wherein the bunk defines a head end and a foot end opposite the head end,
    and wherein the sleeper bunk restraint system further comprises:
    a first bracket mounted to the support surface above the head end of the bunk, and
    a second bracket mounted to the support surface above the foot end of the bunk,
    wherein the first end of the curtain support member is movably mounted to the first bracket and the second end of the curtain support member is movably mounted to the second bracket.

\* \* \* \* \*